(12) United States Patent
Martin et al.

(10) Patent No.: US 12,040,660 B2
(45) Date of Patent: Jul. 16, 2024

(54) PERMANENT MAGNET ROTOR WITH MINIMAL CAGE

(71) Applicant: ABB Schweiz AG, Baden (CH)

(72) Inventors: William E. Martin, Greenville, SC (US); Robert McElveen, Anderson, SC (US); Nicolas Frank, Greer, SC (US)

(73) Assignee: ABB SCHWEIZ AG, Baden (CH)

( * ) Notice: Subject to any disclaimer, the term of this patent is extended or adjusted under 35 U.S.C. 154(b) by 40 days.

(21) Appl. No.: 17/400,970

(22) Filed: Aug. 12, 2021

(65) Prior Publication Data

US 2023/0050994 A1    Feb. 16, 2023

(51) Int. Cl.
| | |
|---|---|
| *H02K 1/276* | (2022.01) |
| *H02K 3/48* | (2006.01) |
| *H02K 15/03* | (2006.01) |
| *H02K 21/12* | (2006.01) |

(52) U.S. Cl.
CPC .............. *H02K 1/276* (2013.01); *H02K 3/48* (2013.01); *H02K 15/03* (2013.01); *H02K 21/12* (2013.01)

(58) Field of Classification Search
CPC .......... H02K 1/276; H02K 3/48; H02K 15/03; H02K 21/12
See application file for complete search history.

(56) References Cited

U.S. PATENT DOCUMENTS

| | | | | |
|---|---|---|---|---|
| 2007/0273234 A1* | 11/2007 | Melfi | ............... | H02K 21/14 310/156.53 |
| 2010/0150748 A1* | 6/2010 | McElveen | ............... | H02K 9/14 29/401.1 |
| 2013/0154426 A1* | 6/2013 | Melfi | ............... | H02K 21/46 310/156.78 |

* cited by examiner

*Primary Examiner* — Christopher M Koehler
*Assistant Examiner* — Viswanathan Subramanian
(74) *Attorney, Agent, or Firm* — Greenberg Traurig, LLP (57) ABSTRACT

The disclosed embodiments describe a partially caged rotor for use in an interior permanent magnet motor and techniques for fabricating thereof. In some embodiments, a caged rotor includes: a rotor core having a shaft; a rotor cage comprising a plurality of conductor bars; and a plurality of permanent magnets at least partially disposed inside a plurality of mounting holes of the core, the plurality of permanent magnets and the plurality of mounting holes forming a plurality of cavities inside the core; wherein each conductor bar is disposed at a respective cavity of the plurality of cavities such that the plurality of conductor bars is of a number greater or equal to 8 and less or equal to 64.

19 Claims, 8 Drawing Sheets

Dispose a Plurality of Conductor Bars within a Plurality of Cavities Formed by a Plurality of Permanent Magnets and a Plurality of Mounting Holes of the Rotor to Fabricate a Caged Rotor The Caged Rotor Comprises: a Rotor Core having a Shaft ; a Rotor Cage Comprising the Plurality of Conductor Bars of a Number that is Greater or Equal to 8 and Less or Equal to 64; and the Plurality of Permanent Magnets At Least Partially Disposed Inside the Plurality of Mounting Holes of Said Rotor Core; each Conductor Bar is Disposed at a Respective Cavity of the Plurality of Cavities

PERMANENT MAGNET ROTOR WITH MINIMAL CAGE

FIELD

This disclosure relates generally to a rotor for use in an electric motor. More particularly, this disclosure relates to a rotor for use in an electric motor such as, but not limited to, an interior permanent magnet motor.

BACKGROUND

Typical interior permanent magnet motors require active control algorithms to maintain stable operation. Line-start permanent magnet (LSPM) synchronous motors employ a rotor winding (e.g., a squirrel cage) for torque production during motor start-up and asynchronous speed operation. At synchronous speed, the rotor permanent magnets provide field excitation and contribute to the electromagnetic synchronous torque. However, since the features such as the rotational speed and the torque of the LSPM synchronous motor depend on the respective applications and functions of the product such as a cooling tower, an air-conditioner, a washing machine, an automobile, etc., in which the LSPM synchronous motor is generally used, the LSPM synchronous motor oftentimes is manufactured depending on the specification of the product itself, thereby rendering the manufacturing cost of the product to be increased.

SUMMARY

In some embodiments, a conductive caged rotor, which can be for use in an interior permanent magnet motor, includes a rotor core having a shaft. In some embodiments, the conductive caged rotor includes a rotor cage including a plurality of conductor bars. In some embodiments, the conductive caged rotor includes a plurality of permanent magnets at least partially disposed inside a plurality of mounting holes of the rotor core. In some embodiments, the plurality of permanent magnets and the plurality of mounting holes form a plurality of cavities inside the rotor core. In some embodiments, each conductor bar is disposed at a respective cavity of the plurality of cavities such that the plurality of conductor bars is of a number greater or equal to 8 and less or equal to 64.

In some embodiments of the conductive caged rotor, for each permanent magnet of the plurality of permanent magnets, the plurality of conductor bars include a conductor bar disposed in an upper cavity facing an outer surface the caged rotor.

In some embodiments of the conductive caged rotor, for each permanent magnet of the plurality of permanent magnets, the plurality of conductor bars further include a conductor bar disposed at a lower cavity facing an adjacent permanent magnet.

In some embodiments of the conductive caged rotor, the plurality of conductor bars further include a conductor bar disposed at a position in a q-axis and close to an outer surface of the caged rotor.

In some embodiments of the conductive caged rotor, when a load coupled to the interior permanent magnet motor incurs a sudden change, an opposing torque is generated by the rotor cage such that damping is provided to maintain the load stable.

In some embodiments of the conductive caged rotor, the interior permanent magnet motor is operated by an adjustable speed drive in a scalar mode.

In some embodiments of the conductive caged rotor, the plurality of conductor bars are disposed such that flux paths of the interior permanent magnet motor are not affected.

In some embodiments of the conductive caged rotor, the interior permanent magnet motor is for use operate a cooling tower.

In some embodiments of the conductive caged rotor, the rotor cage is disposed inside laminations of a line-start permanent magnet (LSPM) in a retrofitting manner.

In some embodiments, a method for fabricating a partial cage for a rotor of an interior permanent magnet motor includes disposing a plurality of conductor bars within a plurality of cavities formed by a plurality of permanent magnets and a plurality of mounting holes of the rotor to fabricate a caged rotor. In some embodiments, the caged rotor includes a rotor core having a shaft and a rotor cage including the plurality of conductor bars of a number that is greater or equal to 8 and less or equal to 64. In some embodiments, the caged rotor includes the plurality of permanent magnets at least partially disposed inside the plurality of mounting holes of the rotor core. In some embodiments, each conductor bar is disposed at a respective cavity of the plurality of cavities.

In some embodiments of the method, for each permanent magnet of the plurality of permanent magnets, the plurality of conductor bars includes a conductor bar disposed in an upper cavity facing an outer surface of the rotor.

In some embodiments of the method, for each permanent magnet of the plurality of permanent magnets, the plurality of conductor bars further include a conductor bar disposed at a lower cavity facing an adjacent permanent magnet.

In some embodiments of the method, the plurality of conductor bars further include a conductor bar disposed at a position in a q-axis of the rotor.

In some embodiments of the method, when a load coupled to the interior permanent magnet motor incurs a sudden change, an opposing torque is generated by the rotor cage such that damping is provided to maintain the load stable.

In some embodiments of the method, a load coupled to the interior permanent magnet motor is operated by an adjustable speed drive in a scalar mode.

In some embodiments of the method, the interior permanent magnet motor is for use to operate a cooling tower.

In some embodiments of a method for fabricating a partially caged rotor for use in a permanent magnet motor, the method includes assembling a rotor core having a shaft. In some embodiments, the method includes forming a plurality of mounting holes in the rotor core. In some embodiments, the method includes disposing a plurality of permanent magnets inside the plurality of mounting holes of the rotor core. In some embodiments, the plurality of permanent magnets and the plurality of mounting holes form a plurality of cavities inside the rotor core. In some embodiments, the method includes disposing a plurality of conductor bars at respective cavities of the plurality of cavities such that the plurality of conductor bars is of a number greater or equal to 8 and less or equal to 64. In some embodiments, the plurality of conductor bars form part of a rotor cage.

In some embodiments of the method, for each permanent magnet of the plurality of permanent magnets, the plurality of conductor bars include a conductor bar disposed in an upper cavity facing an outer surface the caged rotor.

In some embodiments of the method, for each permanent magnet of the plurality of permanent magnets, the plurality of conductor bars further includes a conductor bar disposed at a lower cavity facing an adjacent permanent magnet.

In some embodiments of the method, the plurality of conductor bars further includes a conductor bar disposed at a position of a q-axis of the caged rotor.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

The present disclosure provides a partially caged rotor for use in an interior permanent magnet synchronous motor having advantages of, for example: maintaining improved load stability, withstanding a sudden loss of load, and providing efficient acceleration under load, while allowing the motor to operate with an adjustable speed drive in a scalar (volts/hertz) mode. In an example, CRPM motors can operate a cooling tower on a simple, scalar adjustable speed drive without the need for permanent magnet firmware or algorithms.

Figure 1A:
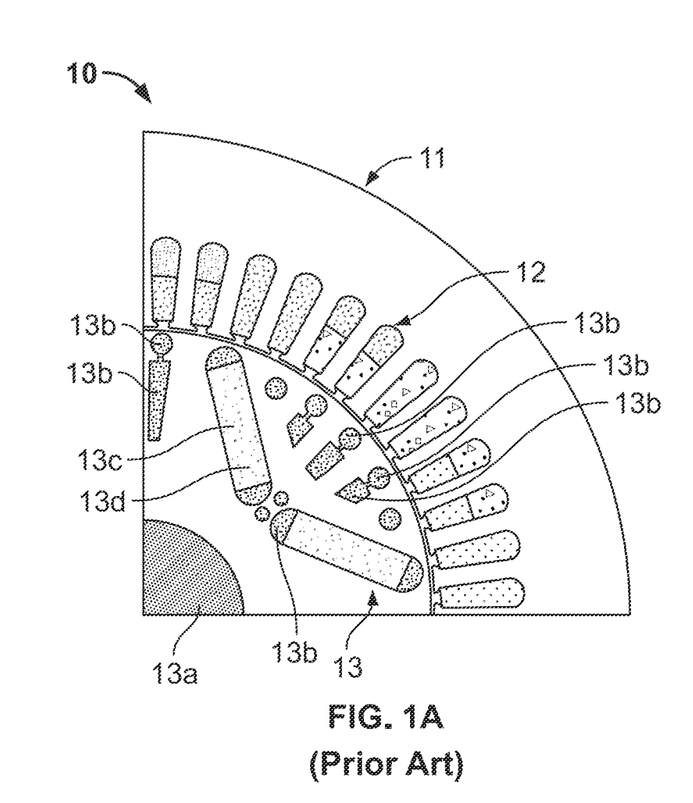
FIG. 1A is an enlarged front view of a portion of a prior art line-start permanent magnet synchronous motor (LSPM).

FIG. 1A is an enlarged front view of a portion of a prior art line-start permanent magnet synchronous motor (LSPM). As shown in FIG. 1A, a conventional LSPM synchronous motor 10 includes a stator 11 fixed to a casing or a shell (not shown), a winding 12 wound to the stator 11, and a rotor 13 installed in the stator 11 with a gap therebetween to be freely movable within the stator 11.

The stator 11 is formed by laminating a plurality of silicon steel plates of the same shape in an axial direction. A hole (not shown) for inserting the rotor 13 therethrough is formed within the stator 11, and a plurality of teeth are formed along an inner surface of the stator 11 so that every two adjacent teeth may be equidistantly apart from each other, thereby forming a slot between every two adjacent teeth.

The winding 12 is wound around each tooth, so that the structure of the stator 11 may cause a rotational magnetic flux to be generated when an AC electric power is supplied to the winding 12.

The rotor 13 is rotatably mounted to a central portion of the stator 11 with a gap formed between the rotor 13 and the stator 11. A shaft 13a runs through and is fixed to an inserting hole (not shown) formed to a central portion of the rotor 13. A plurality of conductor bars 13b are vertically inserted into and fixed along a circumferential portion of the rotor 13, each conductor bar 13b being shaped as a bar. A plurality of magnet mounting holes 13c are formed around the shaft 13a, and a permanent magnet 13d is inserted into and fixed to each magnet mounting hole 13c.

The shaft 13a is mounted to a casing or a shell for forming a case of the LSPM synchronous motor 10, so that the shaft 13a may be rotated by means of bearings (not shown). The conductor bars 13b include aluminum, which has an excellent conductivity and may be subject to a die casting technique. Each permanent magnet 13d is interacted with a magnetic flux generated by the winding 12 so that a torque for driving the LSPM synchronous motor 10 may be generated.

If a current is applied to the winding 12 in the conventional LSPM synchronous motor 10 as described above, the rotational magnetic flux generated due to the structure of the stator 11 is interacted with an induced current generated in the conductor bars 13b of the rotor 13, so that the rotor 13 may be rotated with respect to the stator 11. If the rotor 13 reaches to a synchronization speed, a torque due to the permanent magnets 13d and a reluctance torque due to the specific structure of the rotor 13 are generated to rotate the rotor 13.

Meanwhile, the rotor 13 in the conventional LSPM synchronous motor 10 has the plurality of permanent magnets 13d, wherein the positions of the permanent magnets 13d in the rotor 13, e.g., the configurations of the permanent magnets 13d relative to the conductor bars 13b, have an effect on the features of the motor such as the output thereof.

Although not shown in FIG. 1A, the plurality of conductor bars 13b extend between a pair of end-rings (not shown) to form a squirrel cage (e.g., bar cage). In the illustrated rotor of the LSPM, the plurality of conductor bars 13b include several bars of different shapes and disposed at slots configured at different positions in the lamination of the rotor, arranged substantially symmetrically (i.e., at 90-degree intervals) around the squirrel cage.

Figure 1B:
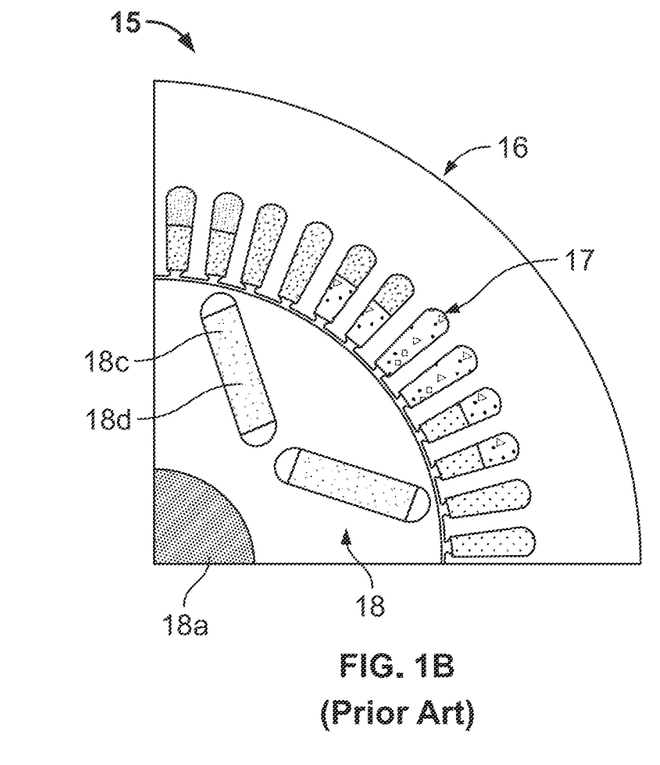
FIG. 1B is an enlarged front view of a portion of a prior art interior permanent magnet synchronous motor (IPM).

Referring to FIG. 1B, an enlarged front view of a portion of a prior art interior permanent magnet synchronous motor (IPM). As shown in FIG. 1B, similar to the conventional LSPM motor 10, a conventional IPM synchronous motor 15, includes a stator 16 fixed to a casing or a shell (not shown), a winding 17 wound to the stator 16, and a rotor 18 installed in the stator 16 with a gap therebetween to be freely movable within the stator 16.

The stator 16 is formed by laminating a plurality of silicon steel plates of the same shape in an axial direction. A hole (not shown) for inserting the rotor 18 therethrough is formed within the stator 16, and a plurality of teeth are formed along an inner surface of the stator 16 so that every two adjacent teeth may be equidistantly apart from each other, thereby forming a slot between every two adjacent teeth.

The winding 17 is wound around each tooth, so that the structure of the stator 16 may cause a rotational magnetic flux to be generated when an AC electric power is supplied to the winding 17.

The rotor 18 is rotatably mounted to a central portion of the stator 11 with a gap formed between the rotor 18 and the stator 16. A shaft 18a runs through and is fixed to an inserting hole (not shown) formed to a central portion of the rotor 18. A plurality of magnet mounting holes 18c are formed around the shaft 18a, and a permanent magnet 18d is inserted into and fixed to each magnet mounting hole 18c. Unlike the LSPM motor 10 of FIG. 1A, the rotor 18 does not have any conductor bars or any conductor bar slots. As such, the rotor of the IPM motor 15 is a cage-less permanent magnet rotor.

The shaft 18a is mounted to a casing or a shell for forming a case of the IPM synchronous motor 15, so that the shaft 18a may be rotated by means of bearings (not shown).

As will be discussed with regard to FIGS. 2A through 2C, the quantity, shape, arrangement, and types of conductor bars are configured by the arrangement of the particular laminations of the rotor body. As such, the geometry should not be limited to the partial squirrel cage formed by the plurality of conductor bars illustrated in FIGS. 2A through 2C. Rather, three possible examples of the partial squirrel cage are shown. In some constructions, the squirrel cage is made of aluminum, which is die-cast into the plurality of laminations of the rotor to form a substantially unitary body. However, other constructions may employ other materials or other processes, (e.g. copper bars brazed to copper end rings) to form the squirrel cage.

Figure 2A:
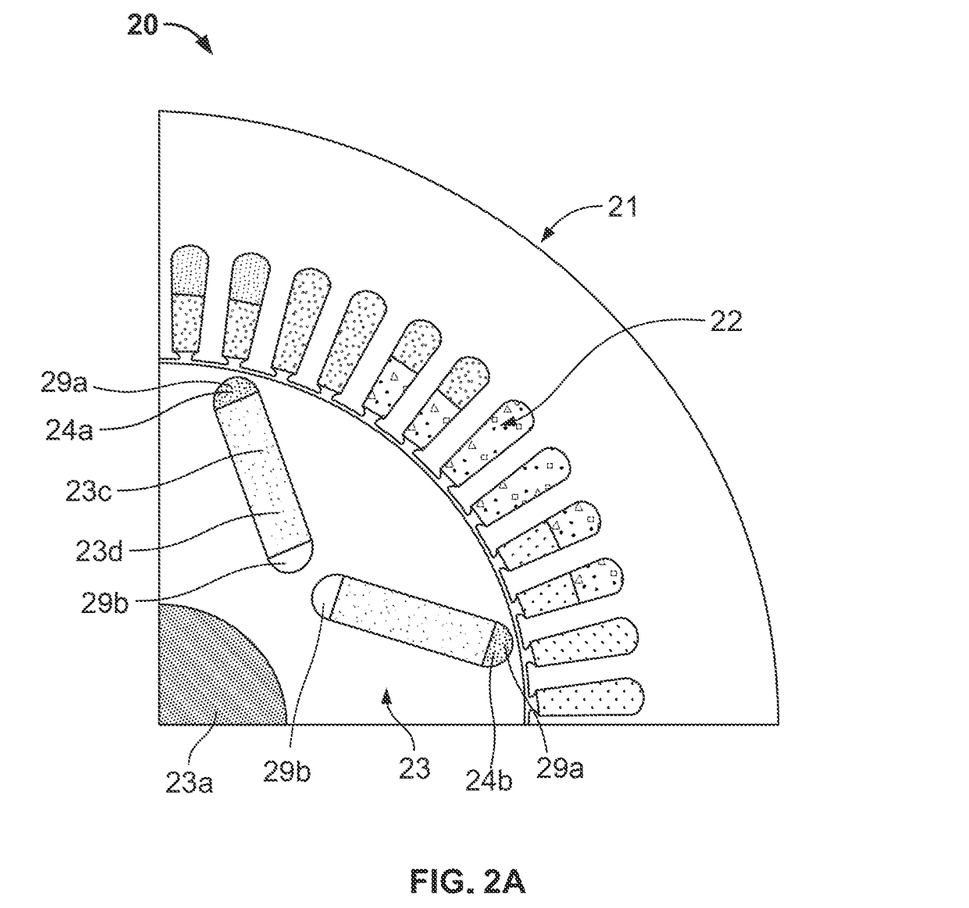
FIG. 2A is an enlarged front view of a portion of an exemplary caged rotor permanent magnet motor (CRPM), in accordance with some embodiments of the present disclosure.

FIG. 2A is an enlarged front view of a portion of an exemplary caged rotor permanent magnet motor (CRPM) 20, in accordance with some embodiments of the present disclosure. As shown in FIG. 2A, similar to the conventional IPM synchronous motor 15, the CRPM motor 20 includes a stator 21 fixed to a casing or a shell (not shown), a winding 22 wound to the stator 21, and a rotor 23 installed in the stator 21 with a gap therebetween to be freely movable within the stator 21.

The stator 21 is formed by laminating a plurality of silicon steel plates of the same shape in an axial direction. A hole (not shown) for inserting the rotor 23 therethrough is formed within the stator 21, and a plurality of teeth are formed along an inner surface of the stator 21 so that every two adjacent teeth may be equidistantly apart from each other, thereby forming a slot between every two adjacent teeth.

The winding 22 is wound around each tooth, so that the structure of the stator 21 may cause a rotational magnetic flux to be generated when an AC electric power is supplied to the winding 22.

The rotor 23 is rotatably mounted to a central portion of the stator 21 with a gap formed between the rotor 23 and the stator 21. A shaft 23a runs through and is fixed to an inserting hole (not shown) formed to a central portion of the rotor 23. A plurality of magnet mounting slots 23c are formed around the shaft 23a, and a permanent magnet 23d is inserted into and fixed to each magnet mounting slot 23c. Unlike the LSPM motor 10 of FIG. 1A or the IPM motor 15 of FIG. 1B, the rotor 23 has two conductor bars 24a and 24b disposed substantially towards the outer surface of the rotor 23. As such, in this exemplary construction, the rotor 23 is a partially-caged permanent magnet rotor.

Each magnet mounting slot 23c includes an elongated middle portion (magnet-receiving portion), and two end cavity portions (e.g., mitten areas). The elongated portion is substantially rectangular and is sized to receive the permanent magnet 23d or permanent magnet material. The two end cavity portions include an upper end cavity portion 29a and a lower end cavity portion 29b, both illustrated as substantially semi-circular. As shown herein, for each magnet mounting slot 23c, the permanent magnet 23d substantially fills the elongated portion such that the two end cavity portions are kept substantially unoccupied by the permanent magnet 23d.

In the construction of FIG. 2A, the conductor bars 24a and 24b are respectively disposed at the upper end cavity portion 29a of the magnet mounting slots 23c. Here, as the end cavity portion of the illustrated magnet mounting slot 23c are substantially semi-circular, the conductor bars 24a and 24b are configured to conform to the shape and size of the upper end cavity end portions 29a, thus substantially filling the upper end cavity end portions 29a. Accordingly, in this construction, the conductor bars 24a and 24b are also substantially semi-circular. Although two conductor bars are illustrated in this portion of the CRPM motor herein, it should be understood that, in this example, a total number of 8 conductor bars are disposed at the respective upper cavity end portions of the magnet mounting slots 23c. The number, arrangement, shape and size of magnet mounting slots 23c, permanent magnets 23d, and conductor bars 24a and 24b are shown for illustrative purposes only, a different number of magnet slots, different shapes, different sizes, or a different arrangement could be employed if desired.

Figure 2B:
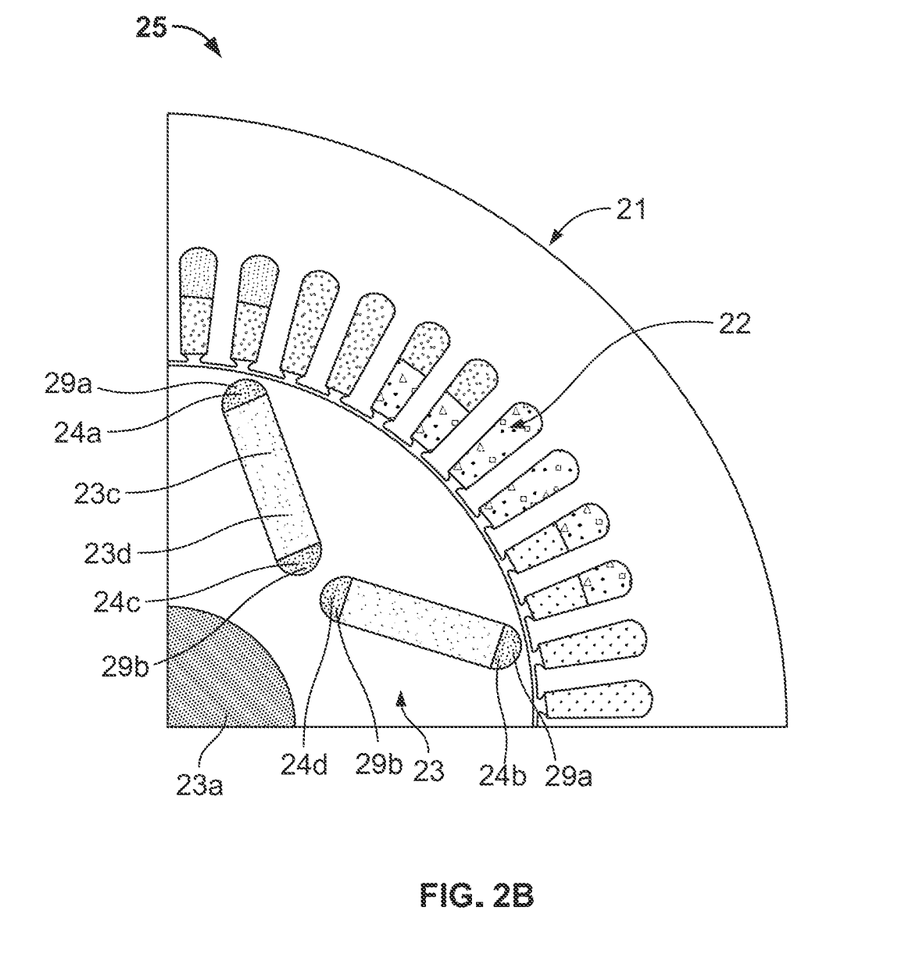
FIG. 2B shows an enlarged front view of a portion of another exemplary caged rotor permanent magnet motor (CRPM), in accordance with some embodiments of the present disclosure.

FIG. 2B shows an enlarged front view of a portion of another exemplary caged rotor permanent magnet motor (CRPM) 25, in accordance with some embodiments of the present disclosure. As shown in FIG. 2B, similar to the conventional IPM synchronous motor 15, the CRPM motor 25 includes a stator 21 fixed to a casing or a shell (not shown), a winding 22 wound to the stator 21, and a rotor 23 installed in the stator 21 with a gap therebetween to be freely movable within the stator 21.

The stator 21 is formed by laminating a plurality of silicon steel plates of the same shape in an axial direction. A hole (not shown) for inserting the rotor 23 therethrough is formed within the stator 21, and a plurality of teeth are formed along an inner surface of the stator 21 so that every two adjacent teeth may be equidistantly apart from each other, thereby forming a slot between every two adjacent teeth.

The winding 22 is wound around each tooth, so that the structure of the stator 21 may cause a rotational magnetic flux to be generated when an AC electric power is supplied to the winding 22.

The rotor 23 is rotatably mounted to a central portion of the stator 21 with a gap formed between the rotor 23 and the stator 21. A shaft 23a runs through and is fixed to an inserting hole (not shown) formed to a central portion of the rotor 23. A plurality of magnet mounting slots 23c are formed around the shaft 23a, and a permanent magnet 23d is inserted into and fixed to each magnet mounting slot 23c. Also unlike the LSPM motor 10 of FIG. 1A or the IPM motor 15 of FIG. 1B, the rotor 23 has four conductor bars 24a, 24b, 24c, and 24d, the conductor bars 24a and 24b disposed towards the outer surface of the rotor 23, while the conductor bars 24c and 24d disposed towards the shaft 23a the rotor 23. As such, in this exemplary construction, the rotor 23 is a partially-caged permanent magnet rotor.

Similarly, each magnet mounting slot 23c includes an elongated middle portion (magnet-receiving portion), and two end cavity portions (e.g., mitten areas). The elongated portion is substantially rectangular and is sized to receive the permanent magnet 23d or permanent magnet material. The two end cavity portions include an upper (outer) portion and a lower (inner) portion, both illustrated as substantially semi-circular. As shown herein, for each magnet mounting slot 23c, the permanent magnet 23d substantially fills the elongated portion such that the two end cavity portions are kept substantially unoccupied by the permanent magnet 23d.

In the construction of FIG. 2B, in addition to the conductor bars 24a and 24b being respectively disposed at the upper end cavity portion of the magnet mounting slots 23c, the conductor bars 24c and 24d are respectively disposed at the lower end cavity portion of the magnet mounting slots 23c. Here, as the lower end cavity portions of the illustrated magnet mounting slot 23c are substantially semi-circular, the conductor bars 24c and 24d are configured to conform to the shape and size of the cavity end portions, thus substantially filling the lower end cavity portions. Accordingly, in this construction, similar to the conductor bars 24a and 24b, the conductor bars 24c and 24d are also substantially semi-circular. Although four conductor bars are illustrated in this portion of the CRPM motor herein, it should be understood that, in this example, a total number of 16 conductor bars are disposed at the respective upper and lower cavity end portions of the magnet mounting slots 23c.

The number, arrangement, shape and size of magnet mounting slots 23c, magnets 23d, and conductor bars 24a, 24b, 24c, and 24d are shown for illustrative purposes only, a different number of magnet slots, different shapes, different sizes, or a different arrangement could be employed if desired. For instance, both the upper end cavity portions and the lower end cavity portion of the magnet mounting slots 23c are illustrated to have a substantially same size and semi-circular shape, it should be understood that the conductor bars 24a and 24b can have a shape, size, material, arrangement that is different than those of the conductor bars 24c and 24d.

Figure 2C:
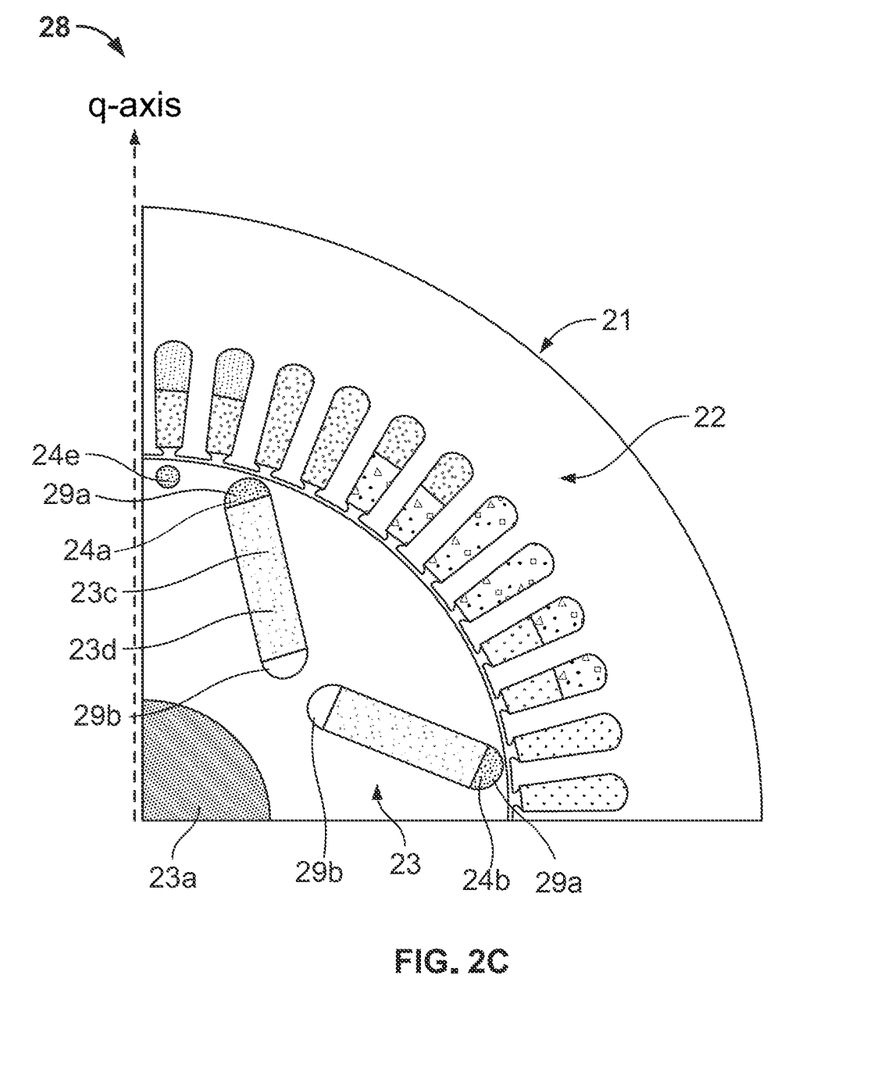
FIG. 2C shows an enlarged front view of a portion of yet another exemplary caged rotor permanent magnet motor (CRPM), in accordance with some embodiments of the present disclosure.

FIG. 2C shows an enlarged front view of a portion of yet another exemplary caged rotor permanent magnet motor (CRPM) 28, in accordance with some embodiments of the present disclosure. As shown in FIG. 2C, similar to the conventional IPM synchronous motor 15, the CRPM motor 28 includes a stator 21 fixed to a casing or a shell (not shown), a winding 22 wound to the stator 21, and a rotor 23 installed in the stator 21 with a gap therebetween to be freely movable within the stator 21.

The stator 21 is formed by laminating a plurality of silicon steel plates of the same shape in an axial direction. A hole (not shown) for inserting the rotor 23 therethrough is formed within the stator 21, and a plurality of teeth are formed along an inner surface of the stator 21 so that every two adjacent teeth may be equidistantly apart from each other, thereby forming a slot between every two adjacent teeth.

The winding 22 is wound around each tooth, so that the structure of the stator 21 may cause a rotational magnetic flux to be generated when an AC electric power is supplied to the winding 22.

The rotor 23 is rotatably mounted to a central portion of the stator 21 with a gap formed between the rotor 23 and the stator 21. A shaft 23a runs through and is fixed to an inserting hole (not shown) formed to a central portion of the rotor 23. A plurality of magnet mounting slots 23c are formed around the shaft 23a, and a permanent magnet 23d is inserted into and fixed to each magnet mounting slot 23c. Also unlike the LSPM motor 10 of FIG. 1A or the IPM motor 15 of FIG. 1B, the rotor 23 has three conductor bars 24a, 24b, and 24e, the conductor bars 24a and 24b disposed towards the outer surface of the rotor 23, while the conductor bar 24e disposed at a q-axis position towards the outer surface of the rotor 23. As such, in this exemplary construction, the rotor 23 is a partially-caged permanent magnet rotor.

Similarly, each magnet mounting slot 23c includes an elongated middle portion (magnet-receiving portion), and two end cavity portions (e.g., mitten areas). The elongated portion is substantially rectangular and is sized to receive the permanent magnet 23d or permanent magnet material. The two end cavity portions include an upper (outer) portion and a lower (inner) portion, both illustrated as substantially semi-circular. As shown herein, for each magnet mounting slot 23c, the permanent magnet 23d substantially fills the elongated portion such that the two end cavity portions are kept substantially unoccupied by the permanent magnet 23d.

In the construction of FIG. 2C, similar to the exemplary construction of FIG. 2A, the conductor bars 24a and 24b are respectively disposed at the upper end cavity portion of the magnet mounting slots 23c. Here, as the upper end cavity portions of the illustrated magnet mounting slot 23c are substantially semi-circular, the conductor bars 24a and 24b are configured to conform to the shape and size of the cavity end portions, thus substantially filling the upper end cavity portions. Accordingly, in this construction, the conductor bars 24a and 24b are substantially semi-circular. Further, an additional conductor bar 24e is disposed at a position in the q-axis of the rotor 23. In this construction, the q-axis conductor bar 24e is shown as substantially circular for illustrative purpose only, and it should be understood that the conductor bar 24e can have a different shape, size, material, number, position, arrangement also suitable.

Although three conductor bars are illustrated in this portion of the CRPM motor 28 herein, it should be understood that, in this example, a total number of 12 conductor bars are disposed at the respective upper and lower cavity end portions of the magnet mounting slots 23c, as well as a q-axis position at the rotor 23. The number, position, arrangement, shape and size of magnet mounting slots 23c, magnets 23d, and conductor bars 24a, 24b, and 24e are shown for illustrative purposes only, a different number of magnet slots, different shapes, different sizes, different positions (relative to the rotor 23 and/or the stator 21, and to each other), or a different arrangement could be employed if desired. For instance, both the upper end cavity portions and the lower end cavity portion of the magnet mounting slots 23c are illustrated to have a substantially same size and semi-circular shape, it should be understood that the conductor bar 24a can have a shape, size, material, arrangement that is different than those of the conductor bar 24b. For another example, the conductor bar 24e can be disposed at any suitable or otherwise desired position in the q-axis of the rotor 23.

In the exemplary constructions of the FIGS. 2A-2C, the conductor bars 24a through 24e are illustrated as substantially filling their respective slot/cavity portions. It should be understood that the conductor bars 24a through 24e can be disposed in such slots/cavity portions, relative to the magnets 23d, and/or the outer surface of the rotor 23, and/or the shaft 23a, in any manner suitable or otherwise desired. For another example, the conductor bars 24a and 24b can be disposed at the upper end cavities portions of the magnet mounting slot 23c to partially occupy the cavity space defined by those end portions such that portions of the air gaps are preserved in the rotor 23.

In some constructions, the conductor bars 24a, 24b, 24c, 24d, and 24e can be configured and disposed in respective angle and therefore skewed. In some constructions, the conductor bars 24a, 24b, 24c, 24d, and 24e can be configured and with respective length that is not necessarily uniform at symmetrical positions.

In some constructions, the conductor bars 24a, 24b, 24c, 24d, and 24e are made of aluminum. In some constructions, aluminum screws are inserted into an ending of the respective conductors to form a squirrel cage, which can be die-cast into the laminations of the CRPM rotor to form a substantially unitary body. However, other constructions may employ other materials or other processes, (e.g. copper bars brazed to copper end rings) to form the squirrel cage.

The following illustrates various exemplary performance analysis results of the above-described exemplary CRPMs in simulated/testing operation showing various improvement over the cage-less IPM with various enhanced features and functionality.

Figure 3:
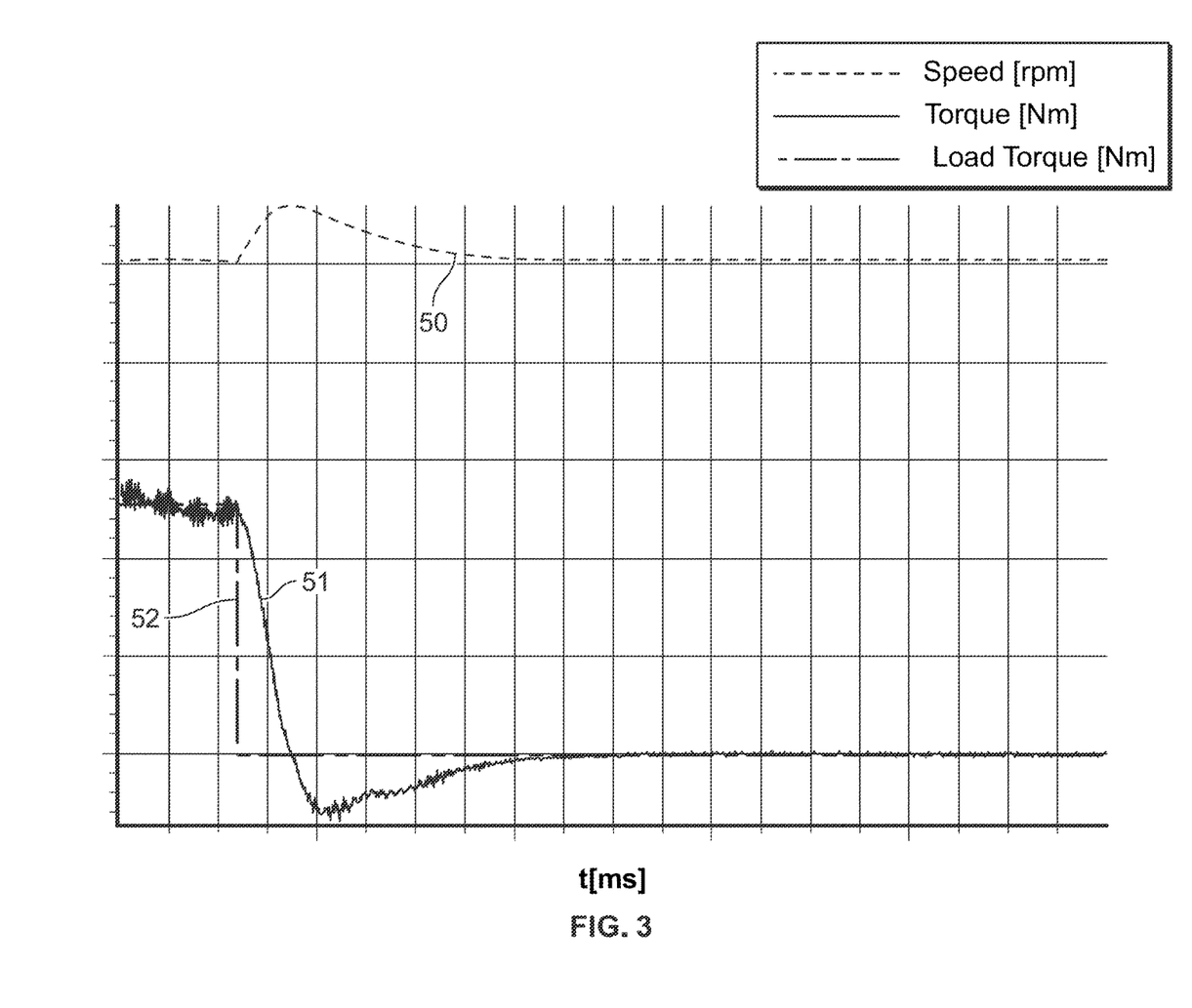
FIG. 3 is a graph illustrating motor performance upon sudden load removal, in accordance with some embodiments of the present disclosure.
Figure 4:
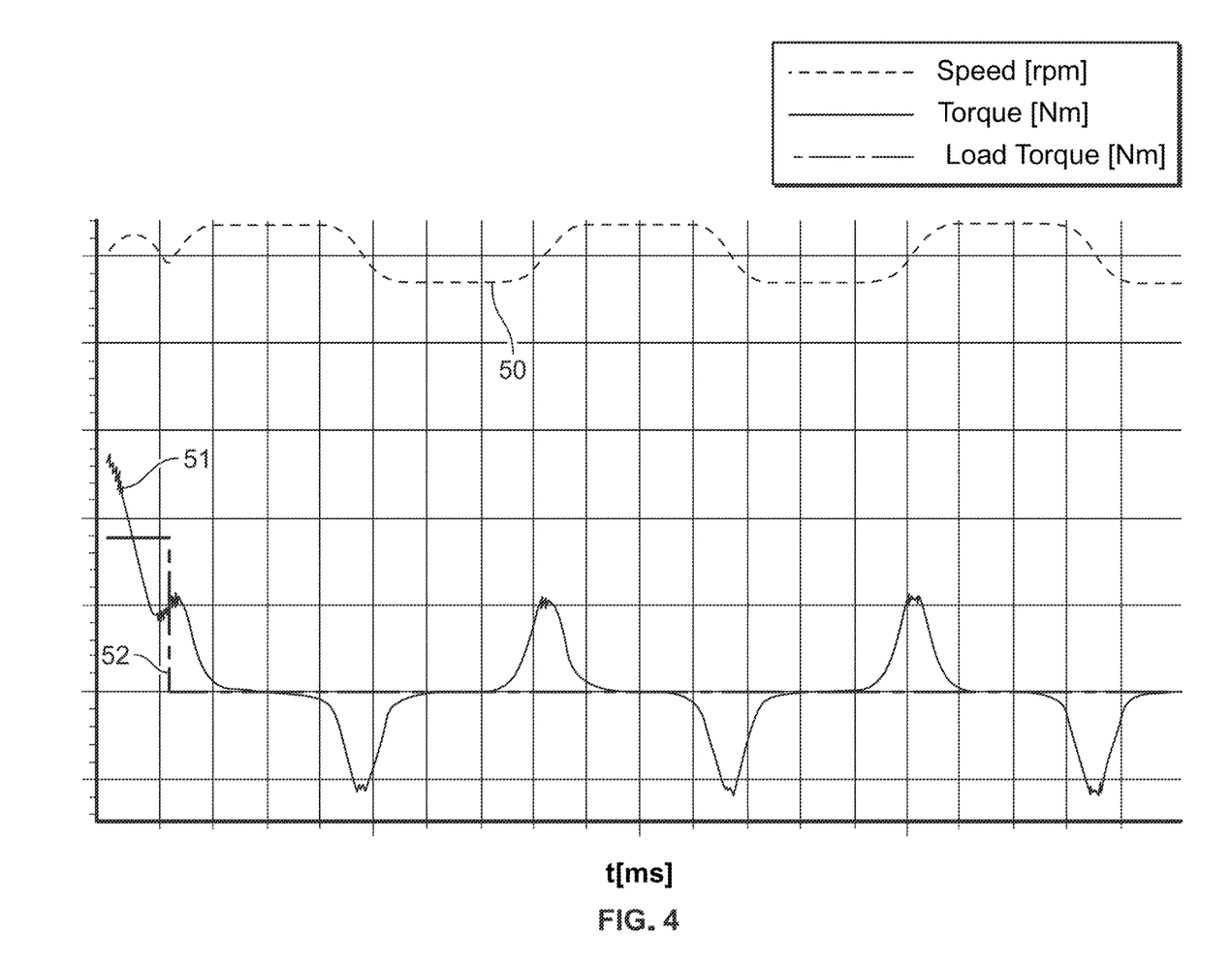
FIG. 4 is a comparative graph illustrating motor performance upon sudden load removal.

FIGS. 3-4 are exemplary graphs illustrating sudden load removal analysis results, in accordance with some embodiments of the present disclosure. FIG. 3 corresponds to an inventive CRPM rotor (e.g., as shown and described in FIGS. 2A-2C) and FIG. 4 shows a comparative example of the IPM rotor (e.g., as shown and described in FIG. 1B).

Here, the test includes bringing a motor up to its rated speed at some amount of load torque (e.g., in steady-state operation) and then suddenly removing the load. For a given load, the motor is deemed to have successfully passed this test if the drive did not trip. The drive tripping is indicative of high current being drawn, and/or DC bus overvoltage due to excessive torque excursions.

For this performance analysis, FIGS. 3 and 4 show exemplary graphs illustrating the analysis results (e.g., simulation data) for the CRPM rotor (FIG. 3) and the IPM rotor (FIG. 4) in simulation, respectively. In the figures, line 50 is representative of a speed (in RPM) over time, line 51 is representative of a torque (in Nm) over time, and line 52 is representative of a load torque (in Nm) over time. As can be seen, the CRPM rotor (FIG. 3), showing improvement over the IPM rotor (FIG. 4), successfully operates through the sudden load change for the simulation. Specifically, exemplary simulations of CRPM rotors withstood the values as tested. Conversely, the prior art IPM simulation (FIG. 4) failed to regain stability under about half of the load.

For the load drop test, in some analysis, it is not necessarily that the motor is not capable of recovering from the load disturbance, but rather that the opposing torque excursions cause a DC bus overvoltage. Further, in testing analysis, it is determined that the CRPM rotors, also similar to the LPSM rotors and showing improvement over the IPM rotors, are capable of dropping the load torque (without tripping).

Here, the test consists of accelerating the dynomometer with a given constant torque applied in a selected time period (e.g., 5 seconds or the like). The test can give an indication of whether and how the cage might help starting a given load. An effort is made to start motors of each configuration under a constant torque load within the selected time period. Starting current was limited to about 200% of rated (e.g., values over 50 A are considered a failed start). The results of these exemplary tests and simulations are obtained. The two sets of analysis show relatively good correlation considering the simulations were run under constant rotor/magnet temperatures of about 45° C. and the actual rotor/magnet temperatures during test are unknown. The analysis results of these exemplary tests and simulations both show that the CRPM rotor of at least FIG. 2A shows improved performance over the IPM rotors of FIG. 1B.

Figure 5:
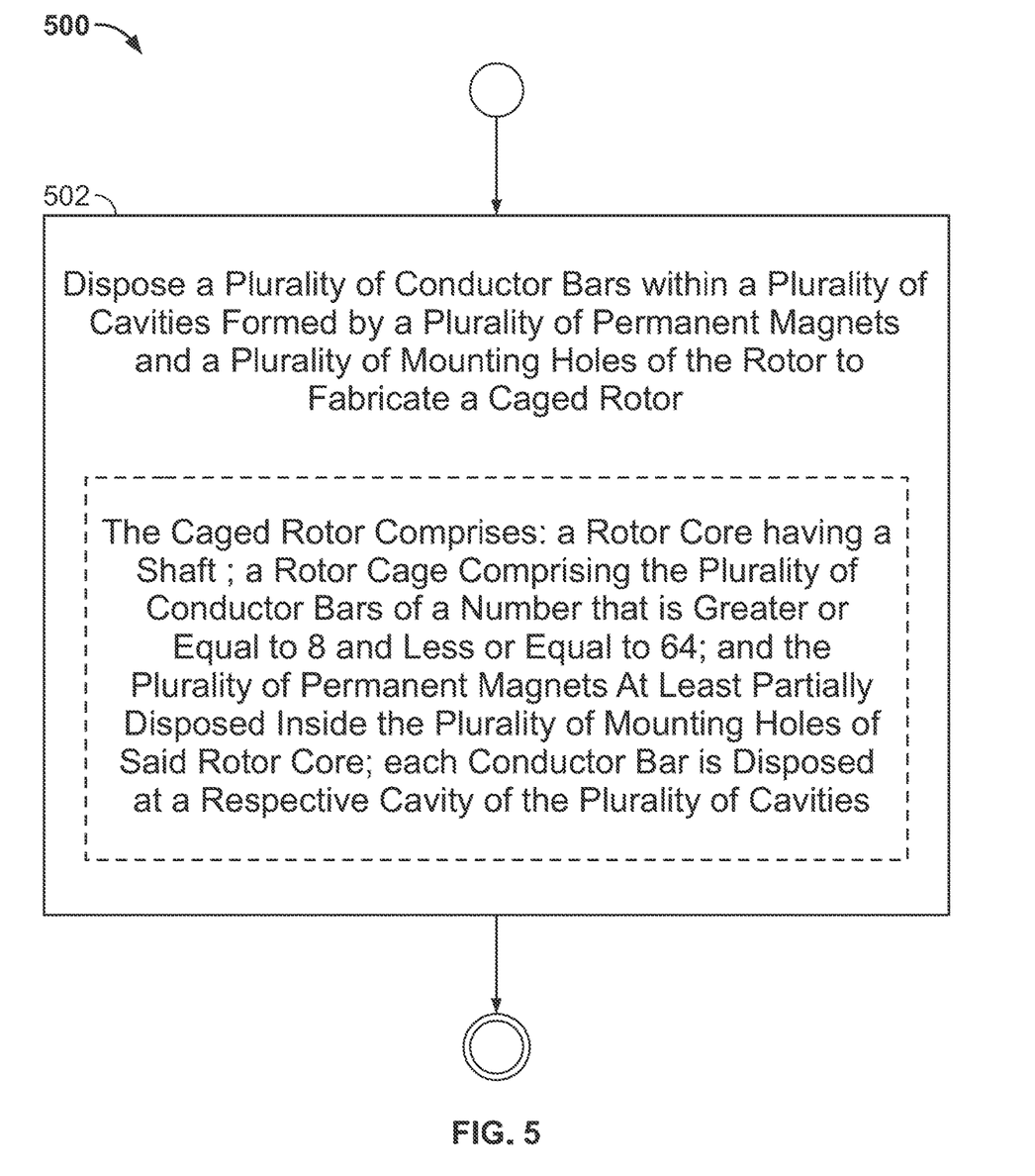
FIG. 5 is a flow illustrating an exemplary process for fabricating a partial cage for a rotor for use in an interior permanent magnet motor, in accordance with some embodiments of the present disclosure.

FIG. 5 is a flow illustrating an exemplary process for fabricating a partial cage for a rotor for use in an interior permanent magnet motor, in accordance with some embodiments of the present disclosure.

In some embodiments, process 500 can be performed by block 502. At block 502, a plurality of conductor bars may be disposed within a plurality of cavities formed by a plurality of permanent magnets and a plurality of mounting holes of the rotor to fabricate a caged rotor. In some embodiments, the caged rotor may include: a rotor core having a shaft; a rotor cage including the plurality of conductor bars of a number that is greater or equal to 8 and less or equal to 64; and the plurality of permanent magnets at least partially disposed inside the plurality of mounting holes of the rotor core. In some other embodiments, each conductor bar is disposed at a respective cavity of the plurality of cavities of the caged rotor.

In some embodiments, for each permanent magnet of the plurality of permanent magnets, the plurality of conductor bars may include a conductor bar disposed in an upper cavity facing an outer surface of the rotor.

In some embodiments, for each permanent magnet of the plurality of permanent magnets, the plurality of conductor bars may further include a conductor bar disposed at a lower cavity facing an adjacent permanent magnet.

In some embodiments, the plurality of conductor bars may further include a conductor bar disposed at a position in a q-axis and close to an outer surface of the rotor.

In some embodiments, when a load coupled to the interior permanent magnet motor incurs a sudden change, an opposing torque may flow to the rotor cage such that damping is provided to maintain the load stable.

In some embodiments, the interior permanent magnet motor may be operated by an adjustable speed drive in a scalar mode.

In some embodiments, the plurality of conductor bars may be disposed such that flux paths of the interior permanent magnet motor are not affected.

In some embodiments, the interior permanent magnet motor may be for use to operate a cooling tower.

In some embodiments, the rotor cage may be disposed inside laminations of an LSPM in a retrofitting manner. For instance, the rotor 13 of the LSPM motor 10 of FIG. 1A may include laminations for disposing the illustrated plurality of conductor bars 13b thereinto to form a squirrel cage. Instead of disposing the full set of conductor bars 13b as illustrated in FIG. 1A to occupy all of the respective slots in the lamination, a subset of conductor bars 13b may be disposed into the selective slots, and thereby forming a partial cage, if the squirrel cage of the LSPM rotor 13 is considered a full cage. Such a partial cage may include a plurality of conductor bars of a number that is greater than zero (0) but less than the number of the conductor bars of the full cage of the LSPM rotor 13. In some embodiments, as illustrated with reference to FIGS. 2A-2C, one or more of respective upper end portions of the magnet mounting holes 13c, respective lower end portions of the magnet mounting holes 13c, and/or a slot at a position on a q-axis of the LSPM rotor 13 may be selected to dispose a sub-set of the full set of the conductor bar 13b of FIG. 1A thereinto, and thereby forming a partially caged rotor.

Figure 6:
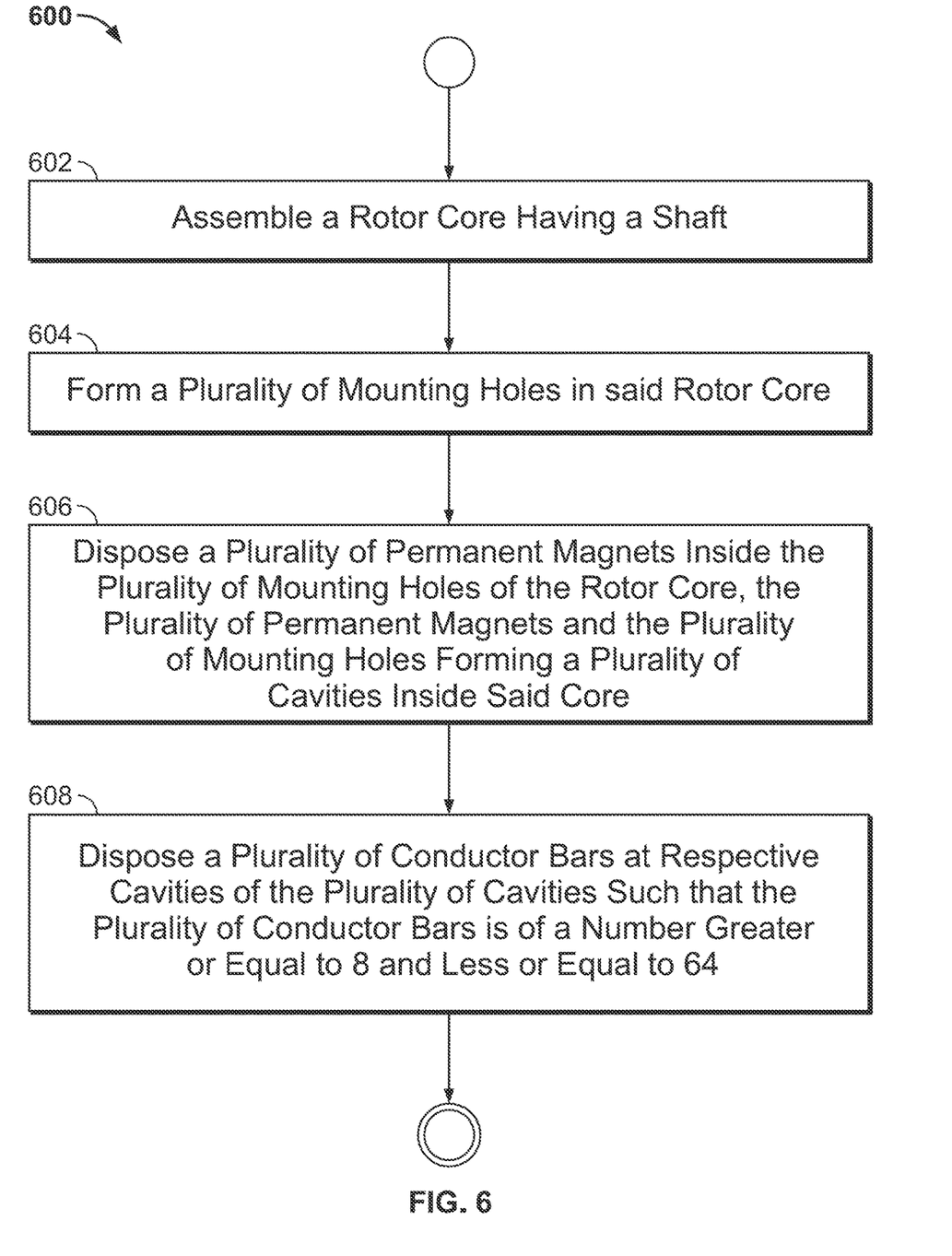
FIG. 6 is a flow illustrating an exemplary process for fabricating a caged rotor for use in an interior permanent magnet motor, in accordance with some embodiments of the present disclosure.

FIG. 6 is a flow illustrating an exemplary process for fabricating a caged rotor for use in an interior permanent magnet motor, in accordance with some embodiments of the present disclosure.

In some embodiments, process 600 can start at block 602. At block 602, a rotor core having a shaft is assembled. At block 604, a plurality of mounting holes are formed in the rotor core. At block 606, a plurality of permanent magnets are disposed inside the plurality of mounting holes of the rotor core, the plurality of permanent magnets and the plurality of mounting holes forming a plurality of cavities inside the core. The process 600 concludes at block 608, at which a plurality of conductor bars are disposed at respective cavities of the plurality of cavities such that the plurality of conductor bars is of a number greater or equal to 8 and less or equal to 64.

In some embodiments, for each permanent magnet of the plurality of permanent magnets, the plurality of conductor bars may include a conductor bar disposed in an upper cavity facing an outer surface of the rotor.

In some embodiments, for each permanent magnet of the plurality of permanent magnets, the plurality of conductor bars may further include a conductor bar disposed at a lower cavity facing an adjacent permanent magnet.

In some embodiments, the plurality of conductor bars may further include a conductor bar disposed at a position of a q-axis of the rotor.

Aspects:

It is to be appreciated that any one of aspects 1-20 can be combined with any one of aspects 1-20.

Aspect 1. A conductive caged rotor for use in an interior permanent magnet motor, comprising: rotor core having a shaft; a rotor cage comprising a plurality of conductor bars; and wherein each conductor bar is disposed at a respective cavity of the plurality of cavities such that the plurality of conductor bars is of a number greater or equal to 8 and less or equal to 64.

Aspect 2. The caged rotor of aspect 1 or any aspect herein, wherein, for each permanent magnet of the plurality of permanent magnets, the plurality of conductor bars comprise a conductor bar disposed in an upper cavity facing an outer surface the rotor.

Aspect 3. The caged rotor of aspect 2 or any aspect herein, wherein, for each permanent magnet of the plurality of permanent magnets, the plurality of conductor bars further comprise a conductor bar disposed at a lower cavity facing an adjacent permanent magnet.

Aspect 4. The caged rotor of aspect 2 or any aspect herein, wherein the plurality of conductor bars further comprise a conductor bar disposed at a position in a q-axis and close to an outer surface of the rotor.

Aspect 5. The caged rotor of aspect 1 or any aspect herein, wherein, when a load coupled to the interior permanent magnet motor incurs a sudden change, an opposing torque is generated by the rotor cage such that damping is provided to maintain the load stable.

Aspect 6. The caged rotor of aspect 1 or any aspect herein, wherein the interior permanent magnet motor is operated by an adjustable speed drive in a scalar mode.

Aspect 7. The caged rotor of aspect 1 or any aspect herein, wherein the plurality of conductor bars are disposed such that flux paths of the interior permanent magnet motor are not affected.

Aspect 8. The caged rotor of aspect 1 or any aspect herein, wherein the interior permanent magnet motor is for use operate a cooling tower.

Aspect 9. The caged rotor of aspect 1 or any aspect herein, wherein the rotor cage is disposed inside laminations of an LSPM in a retrofitting manner.

Aspect 10. A method for fabricating a partial cage for a rotor of an interior permanent magnet motor, comprising: disposing a plurality of conductor bars within a plurality of cavities formed by a plurality of permanent magnets and a plurality of mounting holes of the rotor to fabricate a caged rotor; wherein the caged rotor comprises: a rotor core having a shaft; a rotor cage comprising the plurality of conductor bars of a number that is greater or equal to 8 and less or equal to 64; and the plurality of permanent magnets at least partially disposed inside the plurality of mounting holes of the rotor core; wherein each conductor bar is disposed at a respective cavity of the plurality of cavities.

Aspect 11. The method of aspect 10 or any aspect herein, wherein, for each permanent magnet of the plurality of permanent magnets, the plurality of conductor bars comprise a conductor bar disposed in an upper cavity facing an outer surface of the rotor.

Aspect 12. The method of aspect 11 or any aspect herein, wherein, for each permanent magnet of the plurality of permanent magnets, the plurality of conductor bars further comprise a conductor bar disposed at a lower cavity facing an adjacent permanent magnet.

Aspect 13. The method of aspect 11 or any aspect herein, wherein the plurality of conductor bars further comprise a conductor bar disposed at a position in a q-axis of the rotor.

Aspect 14. The method of aspect 11 or any aspect herein, wherein, when a load coupled to the interior permanent magnet motor incurs a sudden change, an opposing torque is generated by the rotor cage such that damping is provided to maintain the load stable.

Aspect 15. The method of aspect 11 or any aspect herein, wherein a load coupled to the interior permanent magnet motor is operated by an adjustable speed drive in a scalar mode.

Aspect 16. The method of aspect 11 or any aspect herein, wherein the interior permanent magnet motor is for use to operate a cooling tower.

Aspect 17. A method for fabricating a partially caged rotor for use in a permanent magnet motor, comprising: assembling a rotor core having a shaft; forming a plurality of mounting holes in the rotor core; disposing a plurality of permanent magnets inside the plurality of mounting holes of the rotor core, the plurality of permanent magnets and the plurality of mounting holes forming a plurality of cavities inside the core; and disposing a plurality of conductor bars at respective cavities of the plurality of cavities such that the plurality of conductor bars is of a number greater or equal to 8 and less or equal to 64; wherein the plurality of conductor bars form part of a rotor cage.

Aspect 18. The method of aspect 17 or any aspect herein, wherein, for each permanent magnet of the plurality of permanent magnets, the plurality of conductor bars comprise a conductor bar disposed in an upper cavity facing an outer surface the rotor.

Aspect 19. The method of aspect 18 or any aspect herein, wherein, for each permanent magnet of the plurality of permanent magnets, the plurality of conductor bars further comprise a conductor bar disposed at a lower cavity facing an adjacent permanent magnet.

Aspect 20. The method of aspect 18 or any aspect herein, wherein the plurality of conductor bars further comprise a conductor bar disposed at a position of a q-axis of the rotor.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A conductive partially caged rotor for use in an interior permanent magnet motor, comprising:
a rotor core having a shaft, the rotor core comprising:
a plurality of mounting slots, each mounting slot comprising:
an elongate middle portion, and
two end cavity portions comprising:
an upper end cavity at a first end of the elongate middle portion adjacent an outer surface of the rotor core, and
a lower end cavity at a second end of the elongate middle portion adjacent the shaft relative the upper end cavity;
a plurality of permanent magnets at least partially disposed inside the plurality of mounting slots in a respective elongate middle portion;
a plurality of cavities formed by the plurality of mounting slots and the plurality of permanent magnets at the two end cavity portions; and
a rotor cage comprising:
a plurality of conductor bars located inside the plurality of cavities;
wherein each of the plurality of conductor bars is disposed at a respective cavity of the plurality of cavities such that the plurality of conductor bars is of a number greater or equal to 8 and less or equal to 64;
wherein, for each permanent magnet of the plurality of permanent magnets, the plurality of conductor bars comprise a first conductor bar disposed in the upper end cavity facing the outer surface of the rotor cage.

2. The conductive partially caged rotor of claim 1, wherein, for each permanent magnet of the plurality of permanent magnets, the plurality of conductor bars further comprise a second conductor bar disposed at the lower end cavity facing an adjacent permanent magnet in an adjacent mounting slot.

3. The conductive partially caged rotor of claim 1, wherein the rotor cage further comprises a third conductor bar disposed at a position in a q-axis and close to an outer surface of the rotor cage.

4. The conductive partially caged rotor of claim 1, wherein, when a load coupled to the interior permanent magnet motor incurs a sudden change, an opposing torque is generated by the rotor cage such that damping is provided to maintain the load stable.

5. The conductive partially caged rotor of claim 1, wherein the interior permanent magnet motor is operated by an adjustable speed drive in a scalar mode.

6. The conductive partially caged rotor of claim 1, wherein the plurality of conductor bars are disposed such that flux paths of the interior permanent magnet motor are not affected.

7. The conductive partially caged rotor of claim 1, wherein the interior permanent magnet motor is for use operate a cooling tower.

8. The conductive partially caged rotor of claim 1, wherein the rotor cage is disposed inside laminations of a line-start permanent magnet (LSPM) in a retrofitting manner.

9. The conductive partially caged rotor of claim 1, wherein, for each permanent magnet of the plurality of permanent magnets, the plurality of conductor bars comprise a second conductor bar disposed in the lower end cavity adjacent the shaft relative the first conductor bar.

10. A method for fabricating a partial cage for a rotor of an interior permanent magnet motor, comprising:
disposing, in a rotor core having a shaft, a plurality of conductor bars within a plurality of cavities formed by a plurality of permanent magnets and a plurality of mounting slots of the rotor core to fabricate a caged rotor, the plurality of mounting slots comprising an elongate middle portion, and two end cavity portions comprising an upper end cavity at a first end of the elongate middle portion and a lower end cavity at a second end of the elongate middle portion, the lower end cavity being located adjacent the shaft relative the upper end cavity;
wherein the plurality of permanent magnets are at least partially disposed inside the plurality of mounting slots in a respective elongate middle portion;
wherein the caged rotor comprises:
a rotor cage comprising the plurality of conductor bars located in the plurality of cavities of the plurality of mounting slots of a number that is greater or equal to 8 and less or equal to 64; and
wherein each conductor bar is disposed at a respective cavity of the plurality of cavities;
wherein, for each permanent magnet of the plurality of permanent magnets, the plurality of conductor bars comprise a first conductor bar disposed in the upper end cavity facing an outer surface of the rotor cage.

11. The method of claim 10, wherein, for each permanent magnet of the plurality of permanent magnets, the plurality of conductor bars further comprise a second conductor bar disposed at a lower end cavity facing an adjacent permanent magnet.

12. The method of claim 10, wherein the rotor cage further comprises a third conductor bar disposed at a position in a q-axis of the rotor.

13. The method of claim 10, wherein, when a load coupled to the interior permanent magnet motor incurs a sudden change, an opposing torque is generated by the rotor cage such that damping is provided to maintain the load stable.

14. The method of claim 10, wherein a load coupled to the interior permanent magnet motor is operated by an adjustable speed drive in a scalar mode.

15. The method of claim 10, wherein the interior permanent magnet motor is for use to operate a cooling tower.

16. A method for fabricating a partially caged rotor for use in a permanent magnet motor, comprising:
assembling a rotor core having a shaft;
forming a plurality of mounting slots in the rotor core, the plurality of mounting slots comprising an elongate middle portion having a first end and a second end opposite the first end, and two end cavity portions comprising an upper end cavity at the first end of the elongate middle portion, and a lower end cavity at the second end of the elongate middle portion, the lower end cavity being located adjacent the shaft;
disposing a plurality of permanent magnets inside the plurality of mounting slots in a respective elongate middle portion, the plurality of permanent magnets and the two end cavity portions of the plurality of mounting slots forming a plurality of cavities inside the rotor core;
disposing a plurality of conductor bars at respective cavities of the plurality of cavities such that the plurality of conductor bars is of a number greater or equal to 8 and less or equal to 64; and wherein the plurality of conductor bars form part of a rotor cage;

wherein, for each permanent magnet of the plurality of permanent magnets, the plurality of conductor bars comprise a first conductor bar disposed in the upper end cavity facing an outer surface of the rotor cage.

17. The method of claim 16, wherein the plurality of conductor bars are only located in the plurality of cavities or only located in the plurality of cavities and a q-axis position in the rotor cage.

18. The method of claim 16, wherein, for each permanent magnet of the plurality of permanent magnets, the plurality of conductor bars further comprise a second conductor bar disposed at the lower end cavity facing an adjacent permanent magnet.

19. The method of claim 16, wherein the plurality of conductor bars further comprise a third conductor bar disposed at a position of a q-axis of the rotor cage.

* * * * *